US008855638B2

(12) United States Patent
Jin et al.

(10) Patent No.: US 8,855,638 B2
(45) Date of Patent: *Oct. 7, 2014

(54) METHOD FOR TRANSITIONING COMMUNICATIONS OF A MOBILE SUBSCRIBER STATION FROM A SERVING BASE STATION TO A TARGET BASE STATION

(75) Inventors: Yong Suk Jin, Anyang-si (KR); Bin Chul Im, Anyang-si (KR)

(73) Assignee: LG Electronics, Seoul (KR)

( * ) Notice: Subject to any disclaimer, the term of this patent is extended or adjusted under 35 U.S.C. 154(b) by 989 days.

This patent is subject to a terminal disclaimer.

(21) Appl. No.: 11/766,006

(22) Filed: Jun. 20, 2007

(65) Prior Publication Data

US 2007/0243873 A1    Oct. 18, 2007

Related U.S. Application Data

(63) Continuation of application No. 11/570,228, filed as application No. PCT/KR2005/001723 on Jun. 8, 2005, now Pat. No. 8,036,663.

(30) Foreign Application Priority Data

Jun. 8, 2004 (KR) ................. 10-2004-0041575

(51) Int. Cl.
*H04W 36/00* (2009.01)
*H04W 4/00* (2009.01)
*H04W 36/06* (2009.01)
*H04W 36/08* (2009.01)

(52) U.S. Cl.
CPC .............. *H04W 36/06* (2013.01); *H04W 36/08* (2013.01)
USPC ........... 455/436; 455/438; 455/439; 455/442; 455/455; 370/331

(58) Field of Classification Search
USPC ................. 455/403, 436, 438, 442, 455, 525; 370/331
See application file for complete search history.

(56) References Cited

U.S. PATENT DOCUMENTS 5,164,958 A    11/1992 Omura
6,400,952 B2    6/2002 Kim et al.
(Continued)

FOREIGN PATENT DOCUMENTS

CN    1370020    9/2002
EP    1605633    12/2005
(Continued)

OTHER PUBLICATIONS

IEEE P802.16e-D3 (May 2004)—IEEE Draft Amendment—Part 16: Air Interface.*

(Continued)

*Primary Examiner* — Jinsong Hu
*Assistant Examiner* — William Nealon
(74) *Attorney, Agent, or Firm* — Lee, Hong, Degerman, Kang & Waimey

(57) ABSTRACT

A method for transitioning communications of a mobile subscriber station from a serving base station to a target base station includes receiving from the mobile subscriber station a transition request message having an identifier which identifies the mobile subscriber station, and transmitting a transition request notification message having the identifier to the target base station. The method further includes receiving a transition request notification response message having information relating to capabilities of the target base station, and transmitting a transition response message having the information to the mobile subscriber station.

6 Claims, 4 Drawing Sheets

(56) References Cited

U.S. PATENT DOCUMENTS

| | | |
|---|---|---|
| 6,459,689 B1 | 10/2002 | Czaja et al. |
| 2003/0003913 A1 | 1/2003 | Chen et al. |
| 2004/0176094 A1* | 9/2004 | Kim et al. .................... 455/438 |
| 2004/0185852 A1 | 9/2004 | Son et al. |
| 2004/0185853 A1* | 9/2004 | Kim et al. .................... 455/438 |
| 2005/0013386 A1 | 1/2005 | Ojard |
| 2005/0101326 A1 | 5/2005 | Kang et al. |
| 2005/0192011 A1 | 9/2005 | Hong et al. |
| 2005/0192012 A1 | 9/2005 | Choi et al. |
| 2005/0197125 A1 | 9/2005 | Kang et al. |
| 2005/0272403 A1 | 12/2005 | Ryu et al. |
| 2005/0282548 A1 | 12/2005 | Kim et al. |

FOREIGN PATENT DOCUMENTS

| | | |
|---|---|---|
| JP | 10-322760 | 12/1998 |
| JP | 2000125333 | 4/2000 |
| JP | 2003506960 | 2/2003 |
| KR | 10-2000-0032309 | 6/2000 |
| KR | 1020020001937 | 1/2002 |
| KR | 10-2002-0026388 | 4/2002 |
| KR | 1020040016540 | 2/2004 |
| KR | 10-2004-0079661 | 9/2004 |
| WO | WO 01/11804 A1 | 2/2001 |

OTHER PUBLICATIONS

IEEE, C80216e-03_47, (Sep. 4, 2003).*
Barber et al., "MSS Idle Mode," IEEE 802.16 Broadband Wireless Access Working Group, IEEE c802.16e-04/42r6, Mar. 18, 2004.
Hong, "Method for Supporting Near-seamless Frequency Assignment Change," IEEE 802.16 Broadband Wireless Access Working Group, IEEE c802.16e-04/65r1, May 16, 2004.
Sohyun et al. "Overall HO procedures for IEEE 802.16", IEEE C802.16E-03/47, IEEE 802.16 Broadband wireless access working group, Sep. 4, 2003.
Kim et al. "Enhanced handover mechanism in IEEE P802.16e/D2-2004", IEEE c802.16E-04/60r1, IEEE 802.16 broadband wireless access working group, May 15, 2004.
IEEE 802.16 Task Group e. "Part 16: Air Interface for Fixed and Mobile Broadband Wireless Systems—Amendment for Physical and Medium Access Control Layers for combined Fixed and Mobile Operation in Licensed Bands", IEEE 802.16e-03/07r5, IEEE802.16 TGe Working Doc., Dec. 9, 2003.
Hong, S.E. et al. "Method for Supporting Near-Seamless Frequency Assignment Change", IEEE 802.16 Broadband Wireless Access Working Group, IEEE C802.16e04/65r1, May 16, 2004.
Jin, Y.S., et al., "The Method to Reduce a Number of Scanning," IEEE 802.16 TGe Handoff Ad Hoc, Doc. IEEE 802.16e-04_105, Jun. 8 2004.

* cited by examiner

METHOD FOR TRANSITIONING COMMUNICATIONS OF A MOBILE SUBSCRIBER STATION FROM A SERVING BASE STATION TO A TARGET BASE STATION

CROSS-REFERENCE TO RELATED APPLICATIONS

This application is a continuation of U.S. application Ser. No. 11/570,228, filed Dec. 7, 2006, now U.S. Pat. No. 8,036,663, which is the National Stage of International Application No. PCT/KR2005/001723, filed Jun. 8, 2005, which claims the benefit of earlier filing date and right of priority to Korean Patent Application No. 10-2004-0041575, filed Jun. 8, 2004, which are all hereby incorporated by reference in their entirety.

TECHNICAL FIELD

The present invention relates to a handover control method in a broadband wireless access system. Although the present invention is suitable for a wide scope of applications, it is particularly suitable for a base station (BS) to transmit data to a mobile subscriber station (MSS) using at least two frequency allocations (FA).

BACKGROUND ART

Generally, in the IEEE802.16e system of which internal standardization for broadband wireless access system is in progress, more efficient data transmission is enabled using a plurality of frequency allocations (FAs). Namely, unlike the conventional method of transmitting data within a band by allocating one frequency band to one base station, several frequency bands are allocated to one base station to increase subscriber accommodation and to transmit data more efficiently.

FIG. 1 is a diagram of inter-frequency handover within one cell and inter-frequency handover between different cells in a broadband wireless access system supporting multiple FAs.

Referring to FIG. 1, in a multiple FA system, if a mobile subscriber station receives data using a first frequency band FA1 within one cell, it may be attempted to receive data that need a wider bandwidth such as multimedia data. In this case, if a resource of the first frequency band FA1 is already occupied by another mobile subscriber station, it is impossible to offer a multimedia service to the corresponding mobile subscriber station via the first frequency band FA1. So, the multimedia service may be enabled in a manner of allocating a second frequency band FA2 which is still reserved to the corresponding mobile subscriber station.

For this, an inter-FA handover is needed. The inter-FA handover, as shown in FIG. 1, can be performed in two ways. Namely, a first case is that a handover 11 is carried out within one cell from the first frequency band FA1 to the second frequency band FA2. And, a second case is that a handover 12 is carried out from a first frequency band FA1 to a fourth frequency band FA4 in a cell using the first frequency band FA1.

However, in case of using the multiple FA, it is necessary to perform the inter-FA handover within one cell or between different cells. Yet, an inter-FA handover method has not been proposed yet in case of using the multiple FA within one cell.

Besides, in case that a mobile subscriber station performs handover from a serving base station to a handover target base station, it has not been decided yet that the handover is performed in which way of the multiple FA provided by the handover target base station. And, how to perform the handover in such a case has not been proposed yet.

DISCLOSURE OF THE INVENTION

Accordingly, the present invention is directed to a handover control method in a broadband wireless access system that substantially obviates one or more of the problems due to limitations and disadvantages of the related art.

An object of the present invention is to provide a handover control method in a broadband wireless access system, in which a base station transmits data to a mobile subscriber station using at least two frequency allocations.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in a broadband wireless access system supporting multiple frequency allocations, in which a serving base station controls a handover, a handover control method according to the present invention includes the steps of receiving from a mobile subscriber station a handover request message including an identifier of the mobile subscriber station, transmitting a handover request notification message including the identifier of the mobile subscriber station to a handover target base station, receiving a handover request notification response message including information for frequency allocation supportable by the target base station, and transmitting a handover response message including the information for the frequency allocation to the mobile subscriber station.

To further achieve these and other advantages and in accordance with the purpose of the present invention, in a broadband wireless access system, in which one base station supports multiple frequency allocation and controls a handover between frequency allocations, a handover control method includes the steps of transmitting to a mobile subscriber station a handover request message requesting that the handover shall be executed with a specific frequency allocation provided by the base station, receiving a handover execution indication message including information for a handover action mode from the mobile subscriber station, and performing a network reentry procedure with the frequency allocation based on the action mode.

To further achieve these and other advantages and in accordance with the purpose of the present invention, in a broadband wireless access system having a base station supporting multiple frequency allocations, in which a serving base station controls a handover, a handover control method includes the steps of transmitting to a handover target base station a handover request notification message including an identifier of a mobile subscriber station which will perform the handover, receiving from the handover target base station a handover notification response message including information for a frequency allocation supportable for the mobile subscriber station, transmitting to the handover target base station a handover confirmation message notifying that the mobile subscriber station will perform the handover with the supportable frequency allocation, and transmitting to the mobile subscriber station a handover request message requesting the handover with the frequency allocation of the handover target base station.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings.

Figure 1:
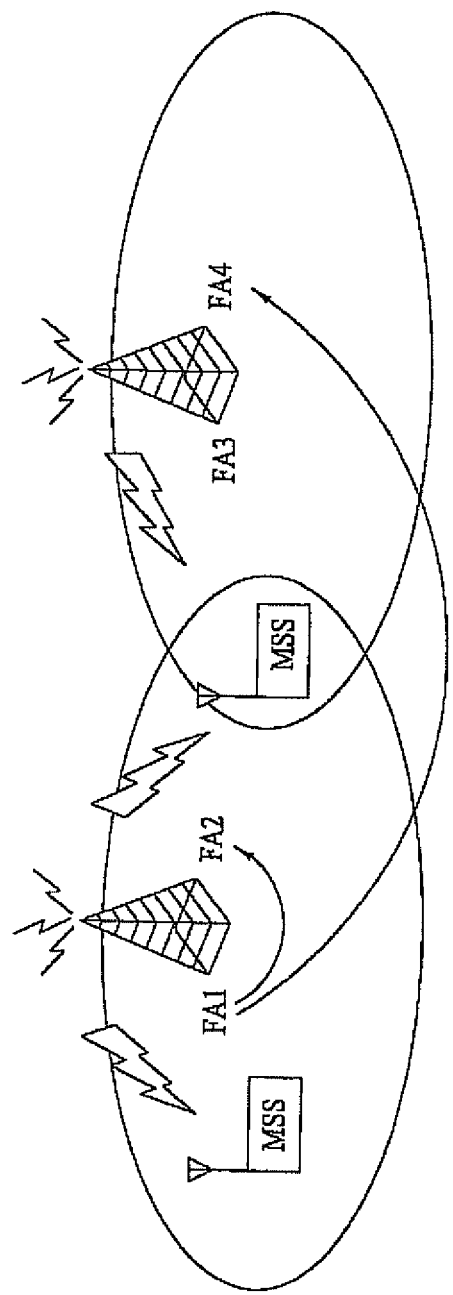
FIG. 1 is a diagram of inter-frequency handover within one cell and inter-frequency handover between different cells in a broadband wireless access system supporting multiple FAs.
Figure 2:
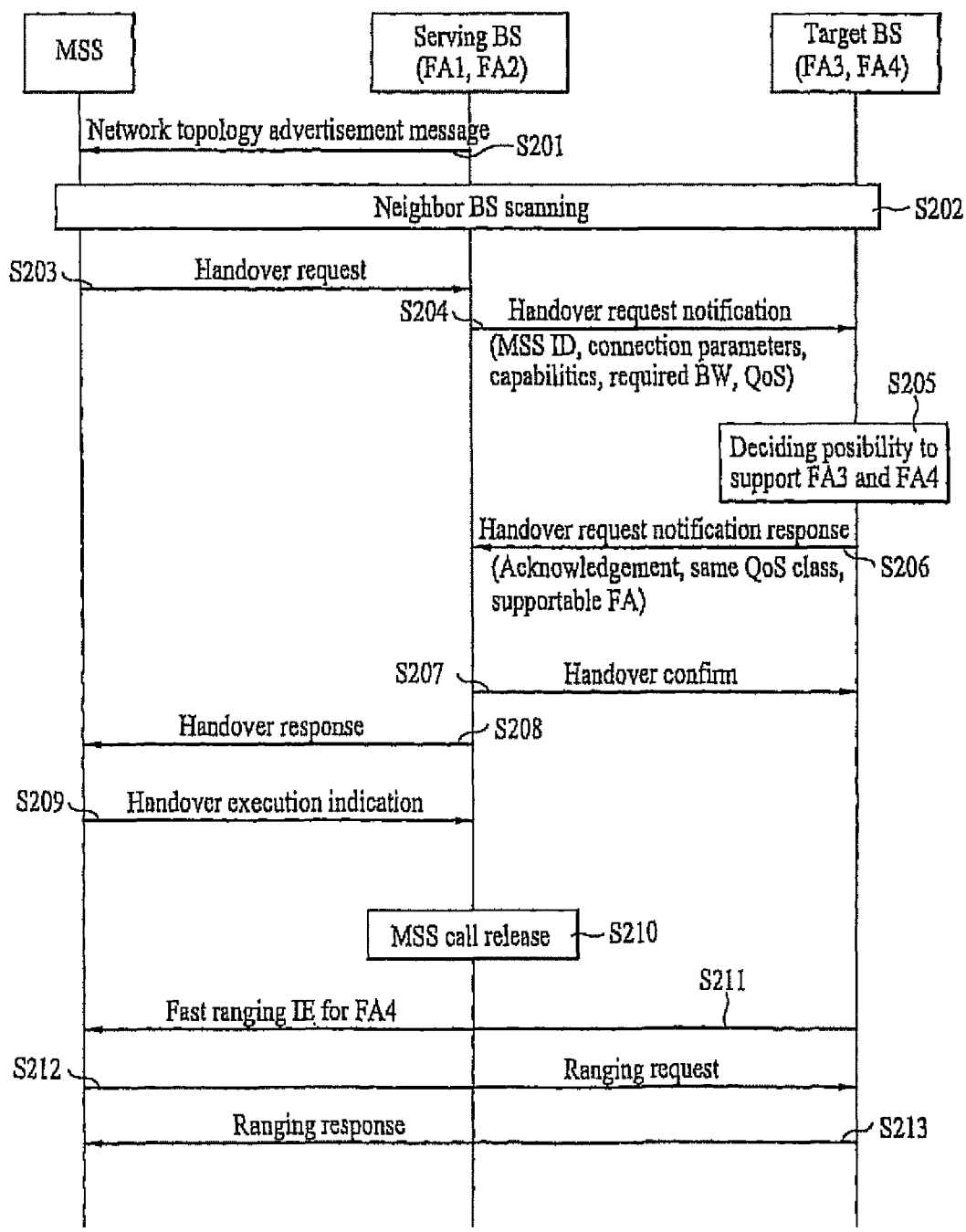
FIG. 2 is a flowchart of a handover process between frequency allocations (FAs) in different cells according to one embodiment of the present invention, in which the handover process is requested by a mobile subscriber station.

FIG. 2 is a flowchart of a handover process between frequency allocations (FAs) to a different cell according to one embodiment of the present invention, in which the handover process is requested by a mobile subscriber station.

Referring to FIG. 2, a serving base station supports a first FA FA1 and a second FA FA2 and a target base station supports a third FA FA3 and a fourth FA FA4, for example.

A base station informs the information of neighbor base stations to all mobile subscriber stations within a cell via a network topology advertisement message (MOB_NBR-ADV) for network configuration associated information (S201). Table 1 shows an example of a network topology advertisement message applicable to the present invention.

TABLE 1

| Syntax | Size | Notes |
|---|---|---|
| MOB-NBR-ADV_Message_Format( ){ | | |
| Management Message Type = 49 | 8 bits | |
| Operator ID | 24 bits | Unique ID assigned to the operator |
| N_NEIGHBORS | 8 bits | |
| For(j=0; j<N_NEIGHBORS; j++){ | | |

TABLE 1-continued

| Syntax | Size | Notes |
|---|---|---|
| Neighbor BS-ID | 48 bits | |
| FA_ID | 8 bits | |
| Configuration Change Count | 8 bits | Increment each time the information for the associated neighbor has changed |
| Hysteresis threshold | 8 bits | |
| MAHO report period | 8 bits | |
| TVL Encoded Neighbor information | variable | TVL specific |
| } | | |
| } | | |

In Table 1, a field FA_ID indicates what kind of FA is supported by a specific neighbor base station.

A mobile subscriber station carries out scanning on neighbor base stations for a scanning section using the network topology advertisement message to check qualities of channels transmitted from the neighbor base stations (S202).

In doing so, the mobile subscriber station can perform a scanning process on all FAs supported by one target base station or can perform a scanning process on one of the entire FAs supported by one target base station. In the following description, a method of scanning one FA only for one target base station supporting multiple FAs is explained.

First of al, once the scanning process is completed, the mobile subscriber station selects a handover target base station suitable for handover from the neighbor base stations. The mobile subscriber station then transmits a handover request message (MOB-MSSHO-REQ) including information of the selected target base station to a serving base station (S203). The serving base station notifies that there exists the mobile subscriber station attempting to make a handover to the handover target base station via a handover request notification message (HO-pre-notification) (S204). And, the handover request notification message includes a mobile subscriber station identifier (MSS Identifier), connection parameters, capabilities, information for a required bandwidth and a quality of service (QoS) and the like.

The handover target base station decides which one of FAs supported by the handover target base station itself is supportable using the information included in the handover request notification message (S205) and then transmits a handover request notification response message (HO-pre-notification-response) including the corresponding result to the serving base station (S206). The handover notification response message includes reception confirmation information for the handover request notification message, information indicating that the same QoS of the QoS class transmitted via the handover request notification message is offered, and the like.

In the present embodiment, although the mobile subscriber station carries out scanning on the third FA (FA3) among the FAs supported by the target base station, a case that the FA supportable by the target base station is the fourth FA (FA4) is explained as follows.

First of all, in case that the target base station can support the fourth FA (FA4), the handover request notification response message indicates that the fourth FA (FA4) is supportable. The supportable FA information can directly indicate center frequency information or can be simplified using an FA identifier (FA_ID) agreed with each FA.

Table 2 shows an example of a handover request notification response message (HO-pre-notification-response) applicable to the present invention.

TABLE 2

| Field | Size | Notes |
|---|---|---|
| Global Header | 152 bits | |
| For(j=0; j<Num Records; j++){ | | |
| MSS unique identifier | 48 bits | 48-bit unique identifier used by MSS (as provided by the MSS or by the I-am-host-of message) |
| BW Estimated | 8 bits | Bandwidth which is provided by BS (to guarantee minimum packet data transmission) TBD how to set this field |
| QoS Estimated | 8 bits | Quality o Service level Unsolicited Grant Service (UGS) Real-time Polling Service (rtPS) Non-real-time Polling Service (nrtPS) Best Effort |
| FA_ID | 8 bits | The identifier of the FA which is recommended |
| } | | |
| Security field | TBD | A means to authenticate this message |

The serving base station having received the handover request notification response message from the target base station notifies the target base station that the handover shall be executed with the fourth FA (FA4) of the target base station via a handover confirmation message (HO-confirm) (S207). And, the serving base station, transmits a handover response message (MOB-HO-RSP) including the center frequency of the fourth FA (FA4) or the previously agreed FA_ID to the mobile subscriber station (S208). Table 3 shows an example of a handover response message applicable to the present invention.

TABLE 3

| Syntax | Size | Notes |
|---|---|---|
| MOB-NBR-ADV_Message_Format( ){ | | |
| Management Message Type = 54 | 8 bits | |
| Estimated HO start | 8 bits | |
| For(j=0; j<N_Recommended; j++){ | | Neighbor base station shall be presented in an order such that the first presented is the one most recommended and the last presented is the least recommended. N_Recommended can be derived from the known length of the message. |
| Neighbor BS-ID | 48 bits | |
| FA_ID | 8 bits | The Identifier of the FA which is recommended |
| Service level predication | 8 bits | |
| } | | |
| } | | |

The mobile subscriber station having received the handover response message transmits a handover execution indication message that indicates a handover execution to the serving base station (S209). The serving base station having received the message then releases a call for the mobile subscriber station (S210).

Table 4 is an example of a handover execution indication message applicable to the present invention.

TABLE 4

| Syntax | Size | Notes |
|---|---|---|
| MOB-BSHO-RSP_Message_Format( ){ | | |
| Management Message Type = 54 | 8 bits | |
| reserved | 6 bits | Reserved; shall be set to zero |
| HO_IND_type | 2 bits | 00: Serving BS release 02: HO cancel 10: HO reject 11: reserved |
| BS_ID | 48 bits | Serving BS ID or Target BS ID |
| FA_ID | 8 bits | The Identifier of the FA |
| HMAC Tuple | 21 bytes | |
| } | | |

In Table 4, in case that the mobile subscriber station performs handover with another FA within the same cell, a field BS_ID indicates an ID of the serving base station and a field FA_ID indicates an identifier of the FA to which the handover will be made.

The mobile subscriber station receives fast ranging IE (Past Ranging_IE) from the selected fourth FA (FA4) of the handover target base station (S211) and requests a ranging to the target base station (S212) using the received IE (S212). The target base station then responds to the ranging (S213) so that the handover is performed.

Figure 3:
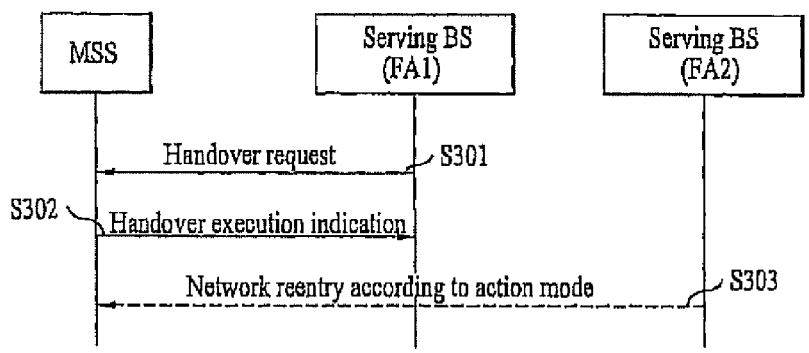
FIG. 3 is a flowchart of a handover process between frequency allocations (FAs) within one cell according to one embodiment of the present invention, in which the handover process is requested by a base station.

FIG. 3 is a flowchart of a handover process between frequency allocations (FAs) within one cell according to one embodiment of the present invention, in which the handover process is requested by a base station.

Referring to FIG. 3, a base station can arbitrarily request a handover without a handover request from a mobile subscriber station (Unsolicited Handover). Namely, the base station transmits a handover request message (MOB-BSHO-REQ) to the mobile subscriber station (S301) so that the mobile subscriber station can perform handover via another FA within the base station. Yet, the mobile subscriber station having received the handover request message does not have to perform the handover all the time but can reject the handover requested from the base station.

The handover request message transmitted from the base station to the mobile subscriber station includes information indicating whether the handover takes place between FAs within one cell or between FAs with the relation to another cell.

Moreover, information for an action mode is included in the handover request message. And, the action mode can include five cases as follows, (1) Handover supported by backbone data exchange on network
(2) Handover not by backbone data exchange on network
(3) A case that directly takes place with a different FA within a cell of a serving base station
(4) A case of undergoing a network entry process for a new FA if handover takes place with a different FA within a cell of a serving base station
(5) A case of enabling a mobile subscriber station to perform fast handover in a manner that a serving base station previously allocates a non-contention ranging area necessary for a handover of the mobile subscriber station and an FA Hence, each of the cases (1) and (2) corresponds to a case that the handover is performed via the FA of the target base station and each of the cases (3) to (5) corresponds to a case that the handover is performed via a different FA within the serving base station.

Table 5 shows an example of a handover request message transmitted from a base station to a mobile subscriber station.

TABLE 5

| Syntax | Size | Notes |
|---|---|---|
| MOB-BSHO-REQ_Message_Format( ){ | | |
| Management Message Type = 52 | 8 bits | |
| FID | 1 bit | 0: Another FA in Serving BS<br>1: FA in recommended BS |
| If(FID==0){ | | |
| FA_ID | 8 bits | The Identifier of the FA |
| }else{ | | |
| N_Recommended | 3 bits | Number of base stations shall be presented in an order such that the first presented is the one most recommended and the last presented is the least recommended. |
| Neighbor BS-ID | 48 bits | |
| FA_ID | 8 bits | The Identifier of the FA |
| service level prediction } } | 8 bits | |
| Action mode | 4 bits | 0x00: network assistant HO support<br>0x01: non network assistant HO support<br>0x02: direct use of own another FA_ID in Serving BS<br>0x03: network entry with another FA_ID in Serving BS<br>0x04: non-contention initial-ranging with another FA_ID in Serving BS<br>0x05 to 0x0f: reserved |
| } | | |

The handover request message, as shown in Table 5, can include the five kinds of action modes.

The mobile subscriber station having received the handover request message transmits a handover execution indication message (MOB-HO-Indication) notifying the handover execution to the serving base station (S302). And, the mobile subscriber station performs a network reentry procedure with the serving base station (S303). In doing so, the mobile subscriber station carries out the network reentry procedure on the FA2 according to one of the five kinds of action modes.

Figure 4:
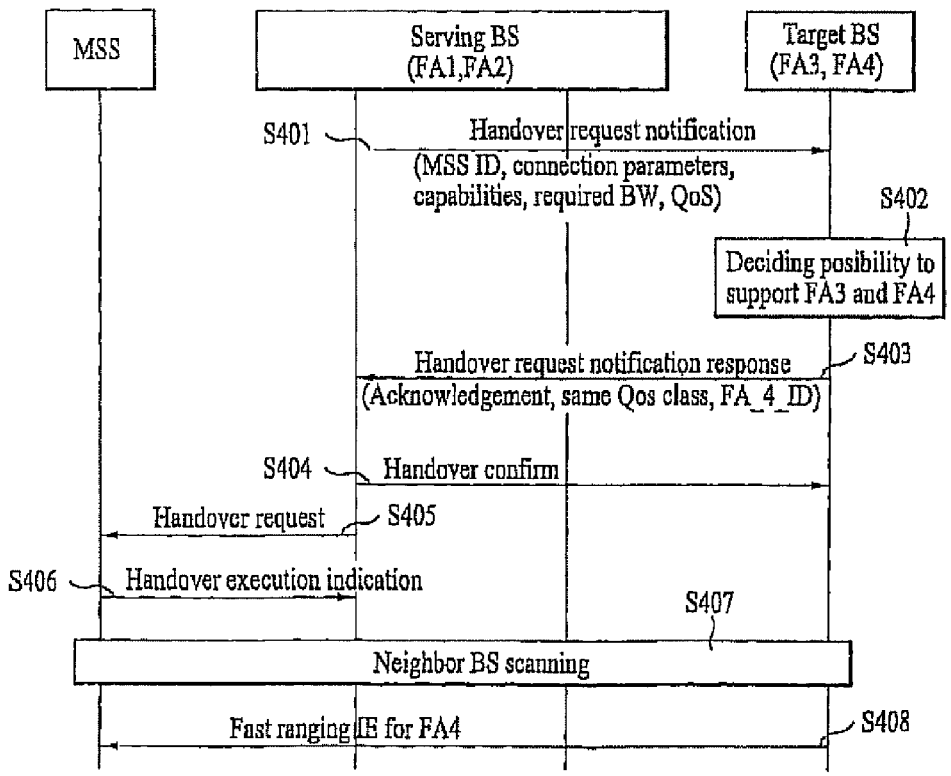
FIG. 4 is a flowchart of a handover process between frequency allocations (FAs) in different cells according to one embodiment of the present invention, in which the handover process is requested by a base station.

FIG. 4 is a flowchart of a handover process between frequency allocations (FAs) in different cells according to one embodiment of the present invention, in which the handover process is requested by a base station.

Referring to FIG. 4, a serving base station notifies that there exists a mobile subscriber station attempting to make a handover to a handover target base station via a handover request notification message (HO-pre-notification) (S401). And, the handover request notification message includes a mobile subscriber station identifier (MSS Identifier), connection parameters, capabilities, information for a required bandwidth and a quality of service (QoS) and the like.

The handover target base station decides which one of FAs supported by the handover target base station itself is supportable for the mobile subscriber station using the information included in the handover request notification message (S402) and then transmits a handover request notification response message (HO-pre-notification-response) including the corresponding result to the serving base station (S403).

The handover notification response message includes reception confirmation information for the handover request notification message, information indicating that the same QoS of the QoS class transmitted via the handover request notification message is offered, and the like (S403).

The supportable FA information can directly indicate center frequency information or can be simplified using an FA identifier (FA_ID) agreed with each FA.

The serving base station having received the response message from the target base station notifies the target base station that the mobile subscriber station will make handover with a specific FA of the target base station via a handover confirmation message (S404).

And, the serving base station transmits information for the specific FA to the mobile subscriber station using a handover request message (MOB-BSHO-REQ) (S405). The mobile subscriber station having received the handover request message then transmits a handover execution indication message (MOB-HO-IND) notifying the handover execution to the serving base station (S406).

The mobile subscriber station performs scanning on neighbor base stations (S407) and decides whether to make handover with the specific FA of the target base station. In case of performing the handover with the specific FA, the mobile subscriber station receives fast ranging IE for the specific FA from the target base station (S408).

Figure 5:
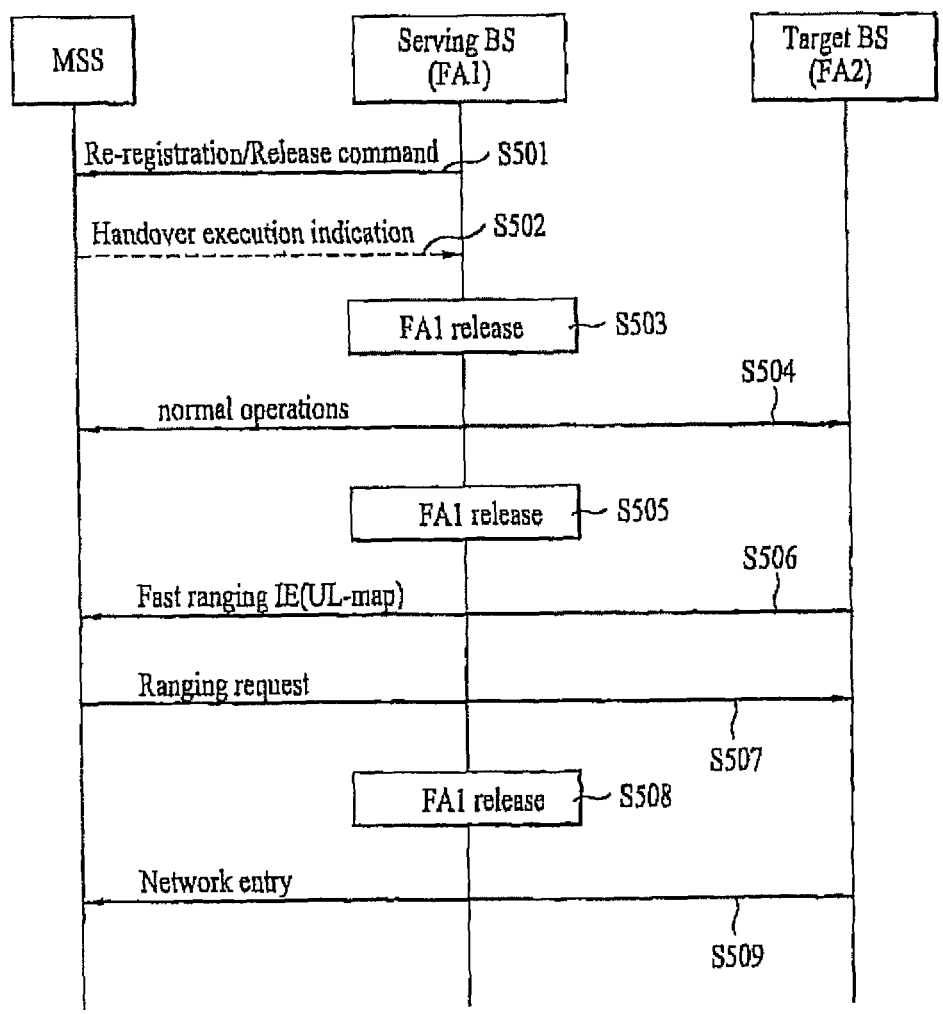
FIG. 5 is a flowchart of a handover process between frequency allocations (FAs) in different cells according to one embodiment of the present invention.

FIG. 5 is a flowchart of a handover process between frequency allocations (FAs) in different cells according to one embodiment of the present invention.

Referring to FIG. 5, a serving base station transmits a re-registration/release command message (DREG-CMD) to a mobile subscriber station (S501). The re-registration/release command message (DREG-CMD) includes action codes having information for action contents performed by the mobile subscriber station in performing handover. Table 6 shows an example of action codes and action contents following the action codes, respectively,

TABLE 6

| Action Code | Action |
|---|---|
| 0x01 | SS shall leave the current channel and attempt to access another channel |
| 0x01 | SS shall listen to the current channel but shall not transmit until an RES-CMD message or DREG-CMD with Action Code 0x00 is received. |
| 0x02 | SS shall listen to the current channel but only transmit on the Basic, Primary Management and Secondary Management connections. |
| 0x03 | SS shall return to normal operation and may transmit any of its active connections. |
| 0x04 | SS shall terminate current Normal Operation with the BS; the BS shall transmit this action code only in response to any SS DREG-REQ |
| 0x05 | Required MSS deregistration from serving BS and request initiation of MSS Idle Mode |
| 0x06 | The MSS may retransmit the DREG-REQ message after the time duration (REQ-duration) given by |
| 0x07 | The MSS shall not retransmit the DREG-REQ message and shall await the DREG-CMD message |
| 0x08 | The MSS shall leave the current FA and move |

TABLE 6-continued

| Action Code | Action |
|---|---|
| | another FA without network reentry. |
| 0x09 | The MSS shall leave the current FA and attempt to non-contention based access another FA. |
| 0x0a | The MSS shall leave the current FA and attempt to access another FA. |

In case that the action code (Action Code) included in the re-registration/release command message is 0x08, the mobile subscriber station releases FA1 from the serving base station (S503) and performs a connection to FA2 in a handover target base station (S504). In doing so, since there exists no network reentry procedure, a MAC address and CID (Connection Identifier) of the mobile subscriber station are maintained.

In case that the action code (Action Code) included in the re-registration/release command message is 0x09, the mobile subscriber station releases FA3 from the serving base station (S505) and performs a connection to FA2 in the handover target base station. In doing so, the mobile subscriber station receives fast ranging IE (S506). Namely, the target base station performs a connection to the mobile subscriber station without contention in a manner of previously allocating FA2 to the mobile subscriber station that performs the handover. Hence, the MAC address of the mobile subscriber station is maintained as it is.

In case that the action code (Action Code) included in the re-registration/release command message is 0x0a, the mobile subscriber station releases FA1 from the serving base station (S508) and newly performs the network reentry procedure on FA2 in the target base station (S509). Hence, the previous information such as the MAC address and CID of the mobile subscriber station are discarded.

INDUSTRIAL APPLICABILITY

Accordingly, in the broadband wireless access system supporting the multiple FA, the present invention provides the following effects or advantages.

First of all, the present invention enables the handover between FAs within one cell.

Secondly, the present invention enables the handover between FAs in different cells.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method for controlling, in a serving base station, a handover of a mobile subscriber station from the serving base station to a target base station supporting multiple frequency allocations (FAs), the method comprising:
   receiving from the mobile subscriber station a handover request message comprising a mobile subscriber station (MSS) identifier which identifies the mobile subscriber station;
   transmitting a handover request notification message from the serving base station to the target base station, wherein the handover request notification message comprises the MSS identifier, connection parameters, capability, required bandwidth and information for quality of service;
   receiving a handover request notification response message by the serving base station from the target base station, the handover request notification response message comprising a frequency allocation (FA) identifier of one FA among the multiple FAs supported by the target base station and a bandwidth estimation provided by the target base station, the one FA being selected by the target base station by using the information of the handover request notification message comprising the MSS identifier, the connection parameters, the capability, the required bandwidth and the information for quality of service; and
   transmitting a handover response message from the serving base station to the mobile subscriber station, the handover response message comprising the FA identifier of the selected FA,
   wherein the mobile subscriber station performs the handover based on the FA identifier of the selected FA.

2. The method according to claim 1, wherein the serving base station is a current base station with which the mobile subscriber station communicates prior to the handover.

3. The method according to claim 1, wherein the MSS identifier comprises a unique identifier used by the mobile subscriber station.

4. A method for performing a handover of a mobile subscriber station from a serving base station to a target base station supporting multiple frequency allocations (FAs), the method comprising:
   transmitting a handover request from the mobile subscribe station to the target base station via the serving base station, the handover request comprising a mobile subscriber station (MSS) identifier which identifies the mobile subscriber station;
   receiving a handover response message by the mobile subscribe station from the serving base station, the handover response message generated responsive to the handover request and comprising a frequency allocation (FA) identifier of one FA among the multiple FAs supported by the target base station and a bandwidth estimation provided by the target base station, the one frequency allocation being selected by the target base station by using the information of a handover request notification message sent from the serving base station to the target base station and comprising the MSS identifier, connection parameters, capability, required bandwidth and information for quality of service; and
   performing, by the mobile subscriber station, the handover based on the FA identifier of the selected FA.

5. The method according to claim 4, wherein the serving base station is a current base station with which the mobile subscriber station communicates prior to the handover.

6. The method according to claim 4, wherein the MSS identifier comprises a unique identifier used by the mobile subscriber station.

* * * * *